United States Patent Office 3,012,080
Patented Dec. 5, 1961

3,012,080
MANUFACTURE OF 1,1-DICHLOROETHANE
Charles R. Bergeron, Baton Rouge, La., assignor to Ethyl Corporation, New York, N.Y., a corporation of Delaware
No Drawing. Filed Sept. 23, 1960, Ser. No. 57,901
3 Claims. (Cl. 260—658)

This invention relates to a method for the production of 1,1-dichloroethane. More particularly, the invention relates to a new and improved low temperature method for the concurrent production of ethyl chloride and 1,1-dichloroethane at very high yields.

Ethyl chloride and 1,1-dichloroethane are of importance because of their applications as intermediate materials in the production of a wide range of valuable chemical derivatives. These compounds are also employed for a wide range of well known end uses. Thus ethyl chloride is useful in the preparation of tetraethyllead and is also used as a refrigerant and as a local freezing anesthetic. 1,1-dichloroethane is useful in the preparation of methyl chloroform and is also used as a degreasing solvent.

It is known that ethyl chloride can be produced in high yield by adding hydrogen chloride to ethylene. Various techniques have been evolved for carrying out this reaction. The most widely used commercial technique involves contacting ethylene with hydrogen chloride in the presence of an aluminum chloride catalyst suspended within a nonaqueous liquid medium. The process incurs a fairly high consumption of catalyst. Present methods for the production of 1,1-dichloroethane also offer this disadvantage and many other disadvantages. Such disadvantages include, in addition to high catalyst consumption, low yields, low conversion to useful by-products, necessity of operating at high temperatures, lack of continuous production, etc.

Accordingly, it is an object of the present invention to provide a new and improved process for the preparation of 1,1-dichloroethane in substantially high yields and without the formation of a large variety of useless by-products. Another object of the invention is to provide a method for the co-current production of ethyl chloride and 1,1-dichloroethane at lower temperatures and at reduced catalyst consumption. Another object is to provide an integrated and improved process enabling the more efficient simultaneous conversion of ethylene and vinyl chloride to useful chlorinated hydrocarbons in a reaction requiring a minimum of equipment, such operation being achieved continuously, smoothly and efficiently.

These and other objects are achieved according to the present invention which is characterized by the steps of simultaneously contacting ethylene and vinyl chloride with hydrogen chloride in the presence of an aluminum chloride catalyst which is suspended in a nonaqueous liquid phase reaction medium. The resulting hydrochlorination reaction is maintained at a temperature of approximately 110 to 180° F., preferably at temperatures of approximately 140 to 160° F., and at a pressure of 50 to 140 pounds per square inch gauge, preferably at a pressure of 100 to 130 pounds per square inch gauge. A molar feed ratio of hydrogen chloride to total olefin (ethylene and vinyl chloride) within the feed is from about 1.1 to 2.0, and greater, with a molar ratio of approximately 1.4 to about 1.6 being preferred.

A highly important feature of the invention is the relation between pressure, temperature and molar feed ratio, i.e., hydrogen chloride to total olefins in the feed. By operating pursuant to these conditions, a conversion of as much as 99 weight percent and greater of the olefin feed to chlorinated products is obtained, and with a very high yield of the co-products ethyl chloride and 1,1-dichloroethane. This production is achieved without the formation of appreciable quantities of useless by-products.

Another very significant feature of the process of this invention is that it involves a much lower catalyst consumption than heretofore possible when hydrochlorinating ethylene alone under generally similar conditions. Thus it has been discovered that catalyst consumption is greatly reduced by feeding varying amounts of vinyl chloride, with ethylene, into a hydrochlorination reaction under the above conditions. In other words, the aluminum chloride catalyst consumed or otherwise inactivated is lessened greatly by simultaneously hydrochlorinating both ethylene and vinyl chloride as contrasted with hydrochlorinating ethylene alone. This beneficial result can be obtained by feeding from about 3 mole percent to about 50 mole percent (or higher), preferably from about 4 mole percent to about 20 mole percent, of vinyl chloride, based on the total olefin feed, with ethylene into a hydrochlorination reaction pursuant to the conditions defined herein. In addition, by feeding hydrogen chloride in greater than the stoichiometric amount required for reaction with the olefins there additionally results a stripping operation which lowers temperature and aids in reducing catalyst consumption and in lessening polymer formation.

To illustrate the advantages derived pursuant to the practice of this invention the data within the following tables are presented. The data within the tables show aluminum chloride catalyst consumption in a hydrochlorination process wherein ethylene alone is reacted with hydrogen chloride (Table I) in a nonaqueous liquid phase reaction medium vis-a-vis hydrochlorination processes wherein varying amounts of vinyl chloride are fed with ethylene into reaction and concurrently hydrochlorinated in a similar nonaqueous liquid phase reaction medium (Table II).

Table I, immediately following, presents data on a process employing an essentially pure ethylene olefin feed stream. The temperature and pressure upon the reactants or upon the liquid phase reaction medium are shown in the first two columns. The liquid phase reaction medium consisted of a mixture of the liquefied chlorinated hydrocarbons being produced, and in the general proportions in which produced. Column three shows the molar excess of hydrogen chloride employed in the reaction. Column four shows the molar conversion of ethylene to ethyl chloride and column five the aluminum chloride catalyst inactivated or consumed in moles per 100 moles of product.

TABLE I

*Process not of this invention—hydrochlorination of ethylene alone*

| Temp., ° C. | Press. (p.s.i.g.) | Molar Excess HCl in Feed | Mole Percent Ethylene Conversion | Catalyst Consumption (Moles per 100 Moles of Product) |
|---|---|---|---|---|
| 65 | 80 | 16 | 92.8 | 0.658 |
| 65 | 80 | 21 | 87.2 | 0.808 |
| 65 | 80 | 24 | 91.1 | 0.665 |
| 65 | 80 | 25 | 90.9 | 0.425 |
| 65 | 100 | 51 | 92.9 | 0.427 |
| 75 | 122 | 53 | 81.7 | 0.388 |

In the following Table II are shown representative data of a process employing a mixed olefin feed consisting essentially of ethylene and vinyl chloride. The same data are presented but with the addition of a column showing the composition of the mixed olefin feed stream.

TABLE II

*Process pursuant to this invention—co-hydrochlorination of ethylene-vinyl chloride mixtures*

| Temp., °C. | Press. (p.s.i.g.) | Olefinic Feed Composition, Mole Percent | Molar Excess HCl in Feed | Mole Percent Olefin Conversion | Catalyst Consumption (Moles per 100 Moles of Product) |
|---|---|---|---|---|---|
| 65 | 65 | 94.4% ethylene / 5.6% vinyl chloride | 19 | 93.0 | 0.403 |
| 65 | 75 | 94.0% ethylene / 6.0% vinyl chloride | 30 | 96.4 | 0.369 |
| 80 | 120 | 94.8% ethylene / 5.2% vinyl chloride | 54 | 94.6 | 0.274 |
| 65 | 85 | 94.4% ethylene / 5.6% vinyl chloride | 65 | 98.4 | 0.289 |
| 65 | 100 | 83.7% ethylene / 16.3% vinyl chloride | 79 | 100 | 0.259 |
| 65 | 100 | 84.1% ethylene / 15.9% vinyl chloride | 86 | 99.9 | 0.379 |

Comparison of the representative data given within Tables I and II clearly shows that the hydrochlorination of the mixed olefin feed stream consisting essentially of vinyl chloride and ethylene produces benefits over and above those processes involving hydrochlorination of ethylene alone. Not only is the aluminum chloride catalyst consumption drastically reduced but also the yield of chlorinated products is greatly improved.

Pursuant to this invention a diluent, such as a hydrocarbon or chlorinated hydrocarbon unreactive at reaction conditions, can also be used in addition to or in place of, the stoichiometric excess hydrogen chloride to effect vapor stripping. Generally the diluent gas, if used to effect vapor stripping, should be from about 10 to 100 percent by volume of the amount of stoichiometric amount of hydrogen chloride added for hydrochlorination.

Generally, the superficial velocity of the gases entering the reaction is maintained from about 0.1 to 1 foot per second of linear velocity; a preferred range being from about 0.4 to about 0.6 foot per second.

The aluminum chloride catalyst is generally maintained at a concentration of from about 1 to 5 percent based on the weight of the nonaqueous liquid reaction bath. A preferred concentration is about 3 percent.

The catalyst is generally kept suspended in the nonaqueous reaction medium by the agitation produced by the entering gases. The reaction products are drawn off as a vapor from above the reaction bath.

The nonaqueous reaction medium can be almost any liquid chlorinated hydrocarbon having a boiling point of greater than about 25° C. Hydrocarbon compounds unreactive at reaction conditions can also be employed. Examples of hydrocarbons and chlorinated hydrocarbons include hexane, heptane, cyclohexane, 1-chlorobutane, 1-chlorooctane, 2-chlorooctane, etc. or mixtures of any of these compounds. A highly preferred reaction medium is one containing a large amount of ethyl chloride. It has been found that by using a bath which includes a high concentration of ethyl chloride further advantages, viz., further decreased catalyst consumption, can be obtained. A preferred and convenient liquid reaction medium is the liquefied products themselves.

As an example of the operation of the process, the following examples are given though they are not intended as limitations. All parts are given by weight unless otherwise specified.

The following example demonstrates a reaction conducted under fairly optimum conditions.

EXAMPLE I

A mixture of 68.7 parts hydrogen chloride, 28.2 parts ethylene and 3.1 parts vinyl chloride are fed into a nonaqueous reaction bath. This corresponds to a feed ratio of 2.2 based on the hydrogen chloride:total olefins fed into the reaction. The nonaqueous reaction bath consists predominantly of a composition of 78.6 percent ethyl chloride and 12.6 percent 1,1-dichloroethane. About 3 weight percent aluminum chloride is added to the liquid bath. The pressure is maintained at 120 pounds per square inch gauge and the temperature at 148° F. The product stream is removed from the reaction vessel as a vapor, is partially condensed and sent to a fractionating column. The product is found to contain 45.1 percent ethyl chloride and 4.0 percent 1,1-dichloroethane, and only 0.3 percent waste and higher chlorinated products. The balance of the product is unreacted hydrogen chloride.

The following example demonstrates the invention under conditions of higher temperature, pressure and catalyst concentration.

EXAMPLE II

The foregoing example is repeated except that in this instance a mixture of 62.8 parts hydrogen chloride, 30.9 parts ethylene and 6.3 parts vinyl chloride are fed into the reaction bath. This corresponds to a hydrogen chloride:total olefin feed ratio of 1.7. The reaction bath is composed of 58.3 percent ethyl chloride and 1.8 percent 1,1-dichloroethane. About 0.3 part of aluminum chloride catalyst, viz., 3 percent, is charged into the reaction bath. During the reaction the pressure is maintained at 140 pounds per square inch gauge and the temperature at 180° F. As in the foregoing example, the product stream is removed as a vapor from the upper portion of the reaction vessel and sent to a fractionating column. The product is found to contain 56.9 percent ethyl chloride and 5.1 percent 1,1-dichloroethane, and only 0.4 percent waste and higher chlorinated products. The balance of the product is unreacted hydrogen chloride.

The following example demonstrates the invention under reduced conditions of temperature, pressure and catalyst concentration.

EXAMPLE III

Example I is again repeated except that in this instance a mixture of 60.4 parts hydrogen chloride, 35.1 parts ethylene, and 4.5 parts vinyl chloride are fed into the reaction bath. This represents a hydrogen chloride:total olefin feed ratio of 1.5. The nonaqueous reaction bath consists predominantly of about 11.0 percent 1,1-dichloroethane and about 85.5 percent ethyl chloride. The catalyst concentration is maintained at 3 percent. The pressure is maintained during reaction at 50 pounds per square inch gauge and the temperature at 125° F. The product stream from the reaction vessel is removed as a vapor, condensed and sent to a fractionating column. The product is found to contain 54.4 percent ethyl chloride and 4.8 percent 1,1-dichloroethane. Only about 0.3 percent waste and higher chlorinated products are found. The balance of the product is unreacted hydrogen chloride.

It is seen that the process of the invention provides an efficient method for the substantially complete conversion of ethylene and vinyl chloride to ethyl chloride and 1,1-dichloroethane and without the formation of useless by-products. This case is a continuation in part of application Serial No. 855,552, filed November 27, 1959.

Having described the invention, what is claimed is:

1. A method for the concurrent manufacture of ethyl chloride and 1,1-dichloroethane comprising simultaneously reacting ethylene and vinyl chloride with hydrogen chloride in a nonaqueous liquid phase reaction medium within which is suspended an aluminum chloride catalyst, said reaction being conducted and maintained at a temperature of from about 110 to 180° F. and at a pressure of from about 50 to 140 pounds per square inch gauge, and the hydrogen chloride being present in quantities of from about 1.1 to 2.0 moles for each mole of the sum total amount of ethylene and vinyl chloride fed into the reaction.

2. The method of claim 1 wherein the aluminum chloride catalyst is present within concentrations of from about 1 to 5 weight percent based on the total weight of the reaction medium.

3. A method for the concurrent manufacture of ethyl chloride and 1,1-dichloroethane comprising simultaneously reacting ethylene and vinyl chloride with hydrogen chloride in a nonaqueous liquid phase reaction medium within which is suspended an aluminum chloride catalyst, said reaction being conducted and maintained at a temperature of from about 140 to 160° F. and at a pressure of from 100 to 130 pounds per square inch gauge, and the hydrogen chloride being present in quantities of from about 1.4 to 1.6 moles to each mole of the sum total amount of ethylene and vinyl chloride fed into the reaction.

No references cited.